Sept. 10, 1968  LE ROY R. BOGGS  3,400,426
CUT-OFF MECHANISM

Filed Dec. 21, 1964  7 Sheets-Sheet 1

INVENTOR.
LeRoy R. Boggs
BY
ATTORNEYS

Fig-2

Sept. 10, 1968  LE ROY R. BOGGS  3,400,426
CUT-OFF MECHANISM

Filed Dec. 21, 1964  7 Sheets-Sheet 3

Fig-3

INVENTOR.
Le Roy R. Boggs
BY
ATTORNEYS

Sept. 10, 1968   LE ROY R. BOGGS   3,400,426
CUT-OFF MECHANISM

Filed Dec. 21, 1964   7 Sheets-Sheet 6

Fig-9

INVENTOR.
LeRoy R. Boggs
BY
ATTORNEYS

United States Patent Office 3,400,426
Patented Sept. 10, 1968

3,400,426
CUT-OFF MECHANISM
Le Roy R. Boggs, Bristol, Tenn., assignor, by mesne assignments, to Koppers Company, Inc., Pittsburgh, Pa., a corporation of Delaware
Filed Dec. 21, 1964, Ser. No. 419,770
6 Claims. (Cl. 18—4)

ABSTRACT OF THE DISCLOSURE

Apparatus for periodically cutting-off finite lengths of a continuously formed article includes at least three cut-off discs or saws that are arranged to rotate in a common plane, perpendicular to the axis of the article, and that are located around the article. The three or more cut-off discs or saws move along lines representing the three sides of a triangle and sever the article as the cut-off discs or saws move linearly with the article during the cutting process. After cutting the article, the cut-off apparatus returns to an initial position.

---

This invention relates to cut-off mechanism adapted for use with equipment for making infinite or continuous lengths of elongated articles, the cut-off mechanism providing for periodically cutting off finite lengths of the article.

In certain operations, for instance in equipment for making elongated articles, such as pipe, composed of fiber reinforced resin material, mechanism is provided for progressively forming and delivering infinite or continuous lengths of such an article, and the cut-off mechanism of the present invention is adapted to periodically cut off finite lengths of the article during the forming and delivery thereof.

For purposes such as described above, it has been known to employ various arrangements of cutting wheels or saws. In a typical prior operation of this kind, a cutting or abrasive disc is employed, the disc having a radius greater than the diameter of the pipe or similar article being made, so that the article may be completely severed by a single pass or cutting motion. Where the article being made is of substantial size, for instance upwards of three or four inches in diameter, the cutting disc must necessarily have a radius of upwards of four or five inches, in view of which in a typical situation the diameter would be something of the order of 10 inches or even more. Cutting discs of such large diameter are expensive and in addition are readily subject to damage. Moreover, because of the size of such cutting discs, it is also difficult to maintain accuracy of cut, because of the flexibility of the large diameter disc.

On the other hand in certain other cut-off operations, provision has been made to employ a smaller diameter cutting disc, and at the same time provide for cutting off of the article by using a plurality of passes or cutting motions or by causing the cutting disc to travel in a circle around the article being severed. This is also subject to difficulties and drawbacks including the fact that if the operation is to be effected automatically (instead of merely by hand) quite complex mechanisms are needed to effect and control the various motions required of the cutting disc. In addition, in the event the article is being formed and delivered in a vertically downward direction, the progressive cutting of the different portions of the section of the article results in asymmetrical suspension of the piece being cut off just before the final cut is made, so that the piece tends to swing to one side, with danger of damage to the piece or to the cutting mechanism.

With the foregoing and various other problems in mind, the present invention provides a novel cut-off arrangement incorporating at least three, and preferably three, cut-off discs or saws arranged to rotate in a common plane and located around the article being formed. Further, when using three cutting discs, as is preferred, the invention provides for a cutting motion of the several discs in three paths which generally represent the three sides of a triangle.

When arranged in the manner just described, the cutting discs may readily be made much smaller than is practicable where a single disc is relied upon to completely sever the article in one pass, each disc cutting through only a portion of the cross section of the article being made, but the several portions when combined providing for cutting through the entire cross section of the article.

The arrangement of the invention also results in symmetry of forces applied to the article during the cutting operation, which is beneficial from a number of standpoints including avoidance of distortion or flexure of the piece and thus inaccuracy of the cut being made, and avoidance of uneven forces and wear upon the cutting elements. When the piece is being delivered in a vertically downward path, with the cutting discs arranged in a horizontal plane, the symmetrical arrangement of the cutting discs also results in suspension of the piece being cut off from several points until the cutting is completed, thereby avoiding tendency for the piece to swing to one side or another.

In accordance with another aspect of the invention, a control system is provided for the cut-off mechanism, the control system being adapted to be actuated by the article being formed, so that upon delivery of any desired predetermined length of the article the control mechanism is tripped or triggered to bring into action the cut-off mechanism. In this way uniform finite lengths of the article being made may automatically be cut off from the continuous progressively formed length thereof being produced.

In considering another important feature of the invention, it is pointed out that the cut-off mechanism is especially adapted for use in connection with equipment incorporating a forming device having a forming passage through which fiber reinforcement and resin are passed and in which the resin is hardened, and further in which powered devices are employed for winding reinforcement fed to the forming passage and for pulling the formed article from the forming passage. In equipment of this sort, in accordance with the present invention, the cut-off mechanism is arranged to follow the motion of the article being made as it is pulled from the forming passage by the powered puller device. The cutting or severing operation will require an interval of time defining a normal range of advancement of the article being made; and in accordance with the present invention if the cut-off mechanism for any reason moves beyond that normal range, the control mechanism is automatically tripped or triggered to terminate the operation of the equipment for producing the article, for instance by terminating the operation of the powered devices for winding reinforcements and for pulling the formed article from the forming passage. In this way a safety feature is provided which comes into action in the event that a cutting disc jams or fails to properly operate, stopping the production of the article being formed and thus avoiding damage which might result from continued delivery of the article in such circumstances.

How the foregoing and other objects and advantages are attained will appear more fully from the following description referring to the accompanying drawings in which.

In considering the following description it is here noted that the cut-off mechanism of the present invention is herein illustrated as associated with equipment for producing elongated articles composed of fiber reinforced resin material, which represents a field in which the invention is especially suitable. Moreover, while the invention is applicable to equipment of a variety of types and to the production of articles of a variety of kinds and shapes, for the purpose of illustration herein, the cut-off mechanism is shown as applied to a machine for producing a hollow or tubular article, for example a cylindrical pipe.

Finally, it is to be noted that although certain features of the invention are applicable to other forms of apparatus for producing elongated articles, some features of the invention are especially applicable to equipment of the kind illustrated in the drawings in which a forming device is provided having a forming passage through which the fiber reinforcement and resin are fed, the equipment further including a powered reinforcement winding device and a powered puller device, both of which are adapted to be shut off by the control system of the cut-off mechanism in the event of over-travel thereof.

Figure 1:
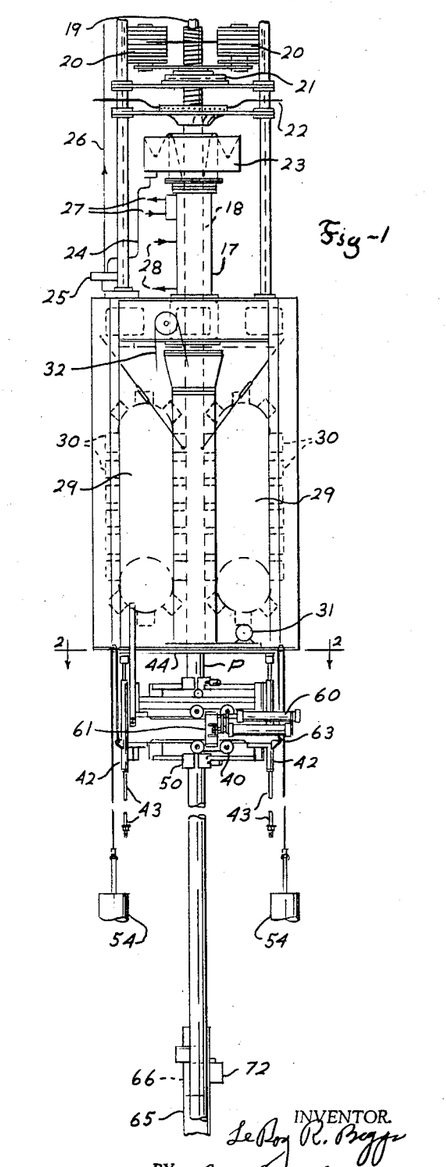
FIGURE 1 is an outline elevational view of a portion of a machine for producing a pipe composed of fiber reinforced resin material and with the cut-off mechanism of the present invention associated therewith.

Such an arrangement is illustrated in outline in FIGURE 1 and as there seen, a forming device 17 is provided with a vertically extended forming passage 18. A core 19 is suspended from a point above the forming device and extends downwardly through the passage 18 in order to define an annular forming passage and thus provide for the production of a tubular article such as the pipe indicated at P. A mechanism of this general arrangement is disclosed in my copending application Ser. No. 299,636, filed Aug. 2, 1963, now Patent No. 3,306,797 and details of such an arrangement need not be considered herein. However, it may be mentioned that it is contemplated in such a machine that liquid heat hardenable resin material be delivered to the surface of the core at a point well above the forming device 17, so as to flood the outside surface of the core. Reinforcements, preferably several layers thereof, including rovings from spools 20 mounted on turntable 21, are wound upon the resin wetted surface of the core. In addition a ply of longitudinally extending rovings 22 may be fed to the surface of the core outside of the helically wound rovings and a similar ply of longitudinal rovings (not shown) may also be applied to the core before application of the helical rovings, as disclosed in my prior application 299,636, above mentioned. The entire mass of impregnated reinforcements are advanced downwardly on the surface of the core and into the upper or entrance end of the forming passage 18. Surrounding the core just above the forming device 17 is a resin receptacle 23 in which excess resin which is fed to the core is collected and from which the excess is withdrawn through a connection 24 and then recirculated by a pump 25 through the pipe 26 to the upper end of the core, all in the manner fully brought out in the copending application above referred to.

The entrance end of the forming passage is desirably cooled by means of a cooling liquid circulated through connections 27, for reasons fully brought out in the above mentioned copending application. In addition the forming device 17 is provided with a jacket and connections 28 for a heating medium by which heat is applied to set and harden the resin before the article is delivered downwardly from the forming passage 18.

The entire mass of material introduced into the forming passage and the article formed therein is caused to advance through the forming passage and to be delivered downwardly by means of a puller mechanism comprising crawler treads 29—29 carrying puller blocks 30 adapted to grip and engage the article being formed and to feed and deliver the same downwardly as indicated at P in FIGURE 1. An appropriate puller mechanism for this purpose is disclosed not only in my copending application referred to but also in my Patent 3,151,354, issued Oct. 6, 1964. A motor indicated in outline at 31 is adapted to provide power for driving the puller mechanism 29–30 through appropriate transmission mechanism not shown but which may be of the kind illustrated in the copending application above referred to. In addition power may be delivered from the motor 31 through other transmission parts including the drive connection 32 to drive shafting extended upwardly to drive the turntable 21 for the roving spools 20. Such mechanism need not be described in detail herein, but reference may be had to said copending application for further information on that subject.

Figure 2:
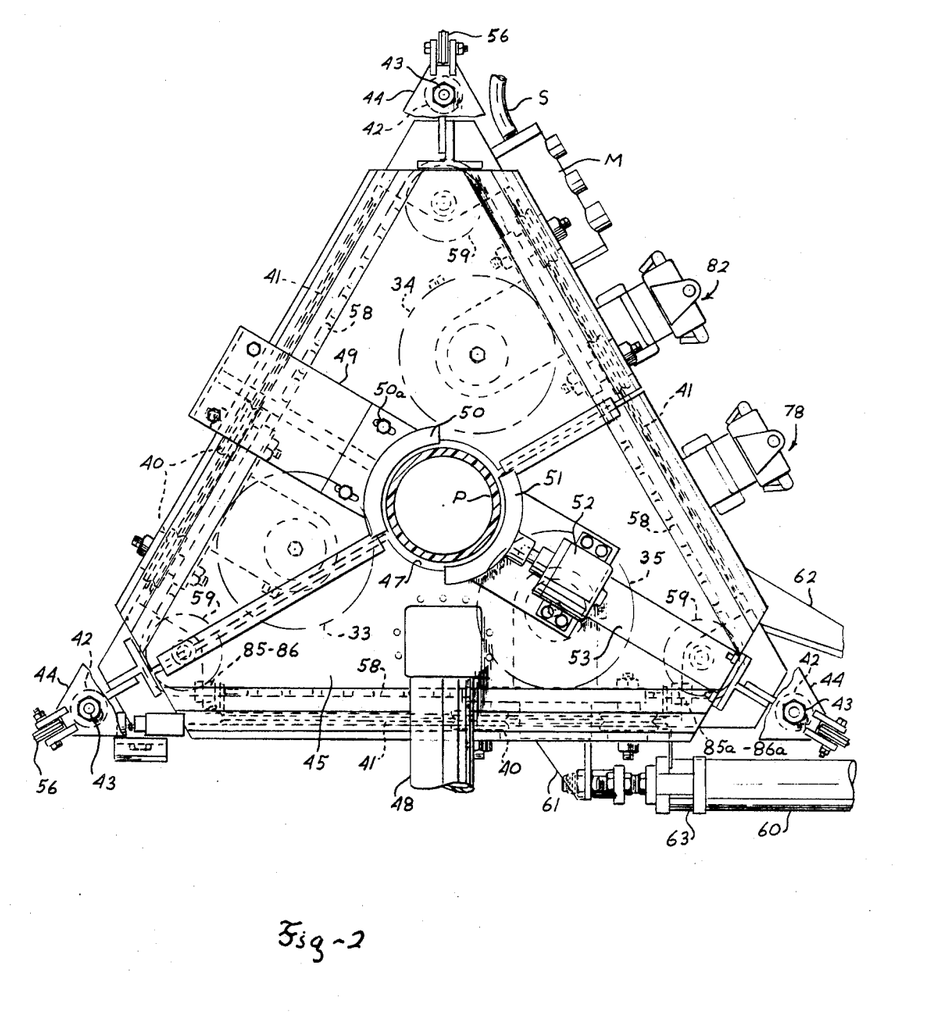
FIGURE 2 is a horizontal sectional view on an enlarged scale, taken as indicated by the section line 2—2 on FIGURE 1.
Figure 3:
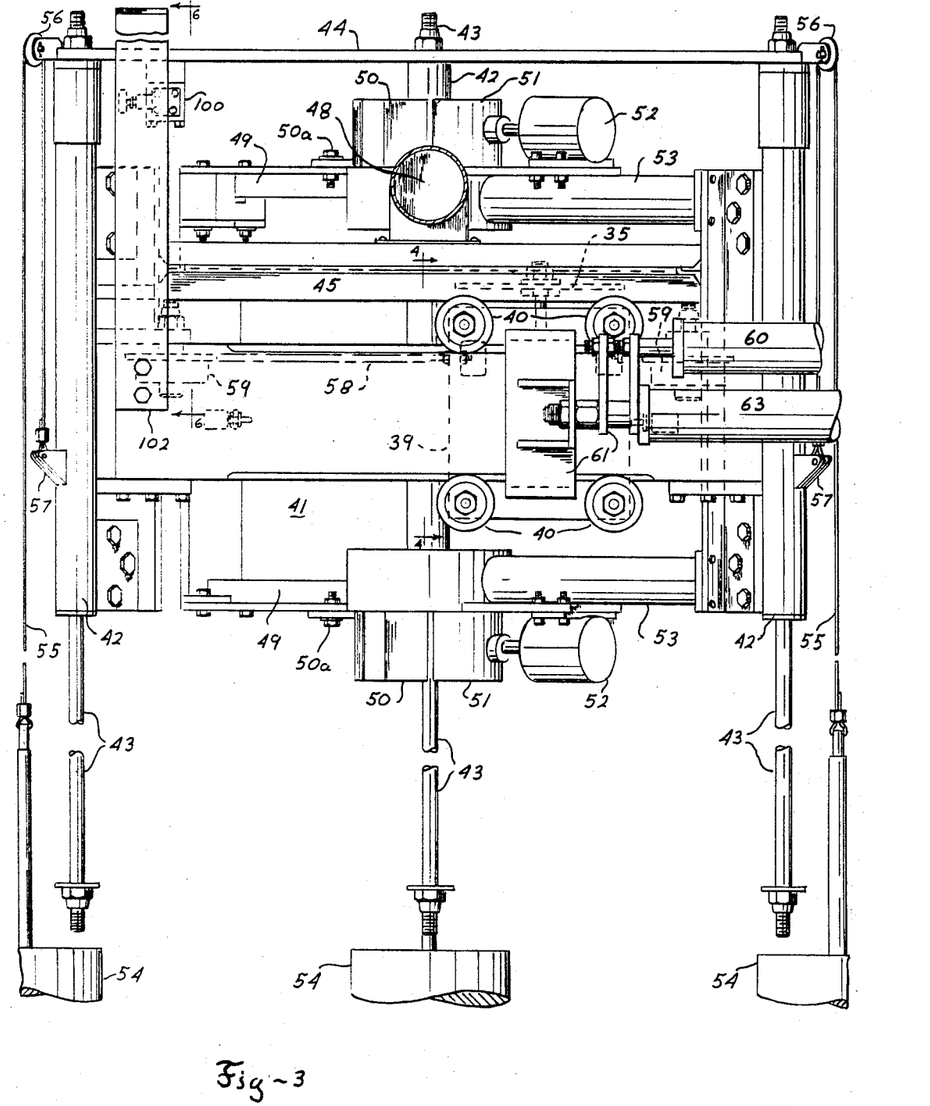
FIGURE 3 is an elevational view of various of the parts of the cut-off mechanism looking toward the mechanism as in FIGURE 1 but on the scale of FIGURE 2.
Figure 4:
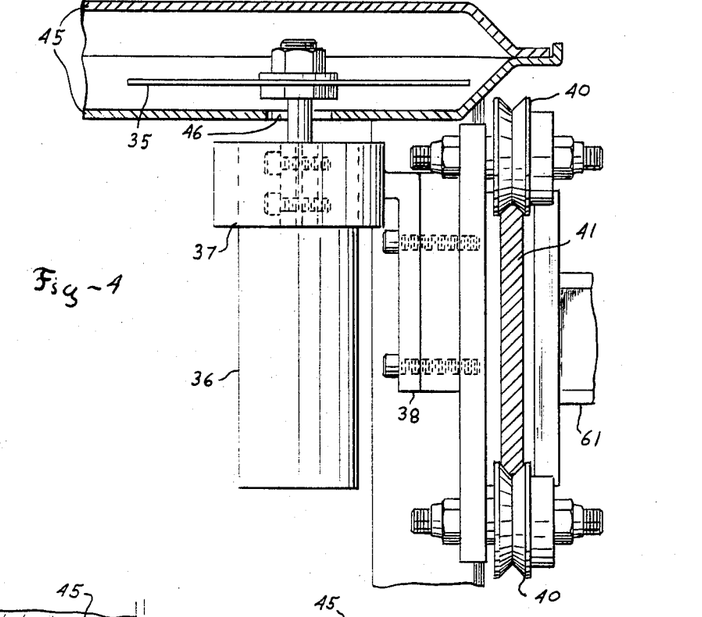
FIGURE 4 is a vertical sectional view taken as indicated by the line 4—4 on FIGURE 3, the view being on a still further enlarged scale.
Figure 5:
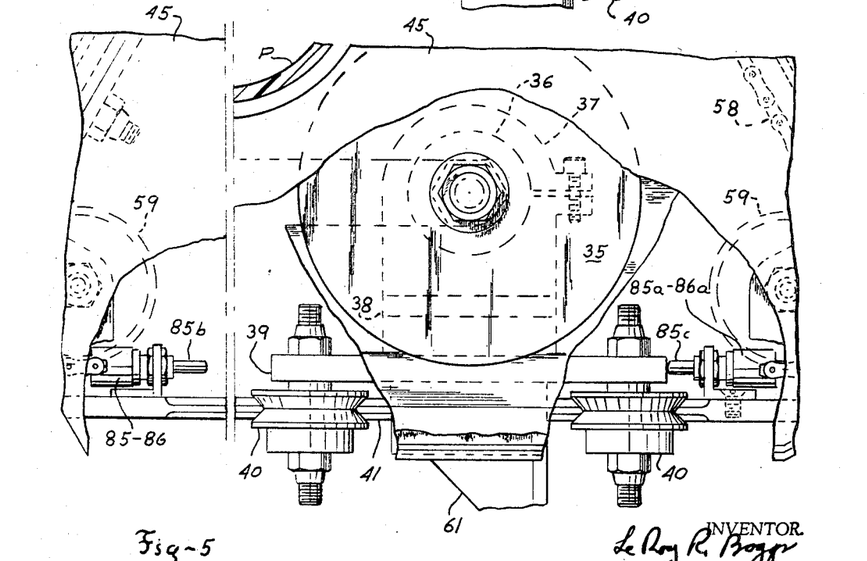
FIGURE 5 is a fragmentary view on the scale of FIGURE 4, showing certain of the parts as viewed from the right of FIGURE 4 and with some parts broken out.
Figure 6:
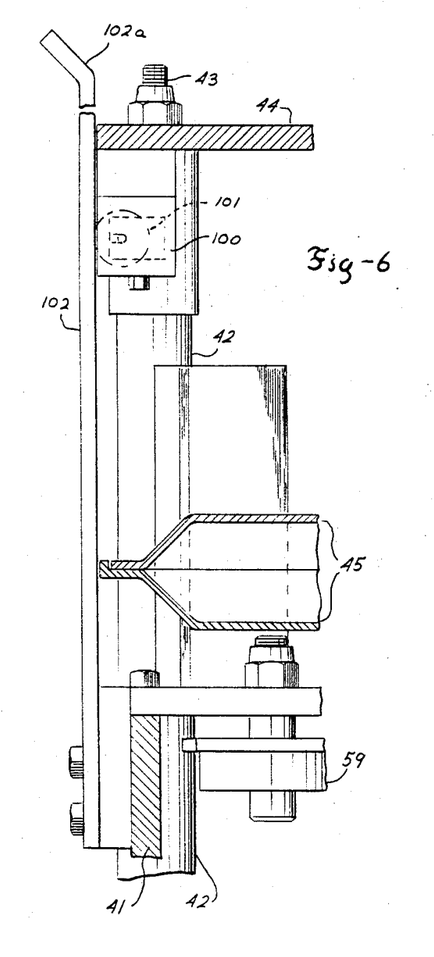
FIGURE 6 is a vertical sectional view taken as indicated by the section line 6—6 on FIGURE 3, this view also being on an enlarged scale as compared with FIGURE 3.

The cut-off mechanism of the present invention although shown in outline in FIGURE 1, is better illustrated in other figures, especially FIGURES 2 and 3, to which reference is now made. Three cutting discs, such as the well-known type of abrasive cutting discs, are indicated at 33, 34 and 35, these discs being mounted to rotate in a common plane, and each being provided with a driving motor such as indicated at 36, for instance an air motor of known type. As best seen in FIGURES 4 and 5, each motor 36 is mounted by means of a clamp 37 mounted on a bracket 38 which in turn is carried by a generally square plate 39. The plate 39 is provided at its corners with four rollers 40 adapted to engage and ride on the upper and lower edges of a track plate or guide 41. The three plates 41, one for each of the three cutting wheels are positioned in triangular interrelation when viewed in plan, i.e., when viewed as in FIGURE 2, and these plates are interconnected at the corners of the triangle through supporting structure fastened to the vertically extended guide posts or tubes 42 which are mounted upon and are adapted to move vertically upon the rods 43 secured at their upper ends to the frame plate 44 only the corner fragments of which appear in FIGURE 2 but the arrangement of which will be clear from examination of FIGURES 1, 2 and 3.

By the arrangements described, the several cutting discs are permitted freedom for traverse motion in paths representing the three sides of a triangle, and in addition, the entire assembly of the parts described is mounted for vertical movement with respect to the rods 43.

The structure also includes a dust cover for the several cutting discs, this cover comprising upper and lower cover plates indicated at 45 in FIGURES 2 to 6. The dust cover is provided with openings such as indicated at 46 in FIGURE 4 to pass the disc mounting shafts projecting upwardly from the disc driving motors 36. These openings are in the form of elongated slots paralleling the tracks 41, so that the discs may move during the traverse or cutting motion without interference from the dust cover. In addition, a central aperture is provided in the dust cover as indicated at 47 in FIGURE 2 to pass the article being made. At one side of the dust cover (see FIGURES 2 and 3) a conduit 48 is provided being connected with the interior of the dust cover and being extended to one side of the apparatus for communication (for instance through a flexible hose) with a vacuum air system so as to withdraw powder and sawchips from the dust cover produced as a result of the cutting operation.

The framing of the cut-off mechanism also includes brackets 49 arranged above and below the cutting discs and the dust cover (see FIGURES 2 and 3) for supporting clamp elements 50 positioned to engage one side of the article being formed. Clamp elements 50 are adjustable by means of bolts 50a passing through slots in the supporting parts. Cooperating movable clamps 51 are arranged opposite to the clamps 50 and these are adapted to be advanced by fluid pressure cylinder devices 52 carried by brackets 53 comprising parts of the frame structure of the cut-off mechanism. When the cylinders 52 are operated to advance the clamp elements 51, the pipe P is gripped between the two pairs of clamping elements 50–51 and this provides for connection of the entire cut-off mechanism with the article being delivered from the forming passage and thus for motion of the cut-off mechanism to follow the article as it is being delivered downwardly. In this way the cutting action of the cutting discs will be maintained in a given relationship to the article being formed for each cutting operation.

The arrangement of pairs of clamping elements 50–51 both upstream and downstream of the plane in which the cut is made is of importance and advantage because this maintains the two portions of the pipe being cut in given relationship until the cut is completed, thereby avoiding damage to or binding of the cutting discs, as well as to damage the portion of the pipe being cut off.

The return or upward motion of the cut-off mechanism is automatically effected upon release of the clamp elements 51 and 51 under the influence of counterweights indicated at 54, there being three such counterweights provided, and each one being slung from a cable 55 passing over a pulley 56 mounted on the fixed plate 44 and connected at 57 with one of the vertical posts 42 incorporated in the frame structure of the cut-off mechanism.

All three of the cutting discs are caused to move concurrently along their tracks 41 by means of chains 58 which interconnected adjacent cutting disc mounting plates 38 around the triangle, idler sprockets 59 being provided at the corners (see FIGURES 2 and 3). The cutting discs are thus caused to follow cutting paths as indicated somewhat diagrammatically in FIGURE 9, disc 33 moving from the position shown in full lines to the position shown in dotted lines at 33a, disc 34 moving from the position shown in full lines to the position shown in dotted lines at 34a, and disc 35 moving from the position shown in full lines to the position shown in dotted lines at 35a. From FIGURE 9 it will also be seen that these cutting motions of the cutting discs each result in severing a portion only of the cross section of the pipe P being made, although the portions cut by each disc, when combined, provide for complete severance of the cross section of the pipe. The application of the cutting forces in this manner provides a balance of such forces around the article being made with advantages already mentioned above.

Figure 9:
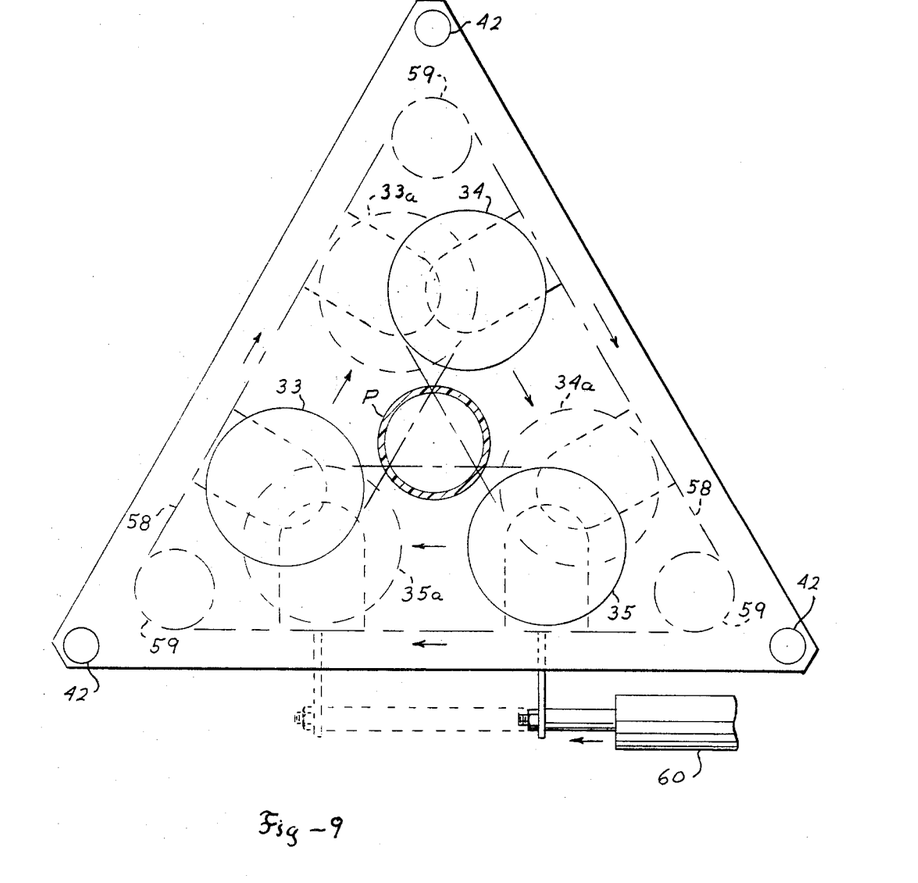
FIGURE 9 is a somewhat diagrammatic plan view illustrating the article being formed in horizontal section and also illustrating the positioning and motions of three cutting discs according to the invention.

This cutting motion of the several cutting discs is effected by means of a fluid pressure cylinder device indicated in outline in FIGURE 9 at 60, and also shown in FIGURES 1, 2 and 3. The piston rod of this device is connected through bracket structure 61 with the square mounting plate 39 for one of the cutting discs, and in view of the interconnection of the several mounting plates 39 through chain 58, this one connection serves to operate all three of the cutting discs in unison. It will be understood that the end of the cylinder 60 remote from the bracket 61 is anchored to some point on the frame structure of the cut-off mechanism, a portion of a bracket provided for this purpose being indicated at 62 in FIGURE 2.

In addition to the actuating cylinder 60, a hydraulic dashpot 63 is also provided, being arranged and mounted in parallel with the cylinder 60, this device serving to retard or control the action of the cylinder and thus ensure an even and steady cutting stroke.

Attention is now called to the fact that it is contemplated in accordance with the invention that the cylinder 60 be of double acting type and that one cut be made by the motion of the cutting discs from the full line positions indicated in FIGURE 9 to the dotted line positions indicated in that figure; and that the next succeeding cut be made by the return motion of the cutting discs. In this way the cutting discs need not be returned to the same starting position for each cut, which would be disadvantageous because the return stroke would be interfered with by a succeeding portion of the pipe being made.

Figures 7, 8:
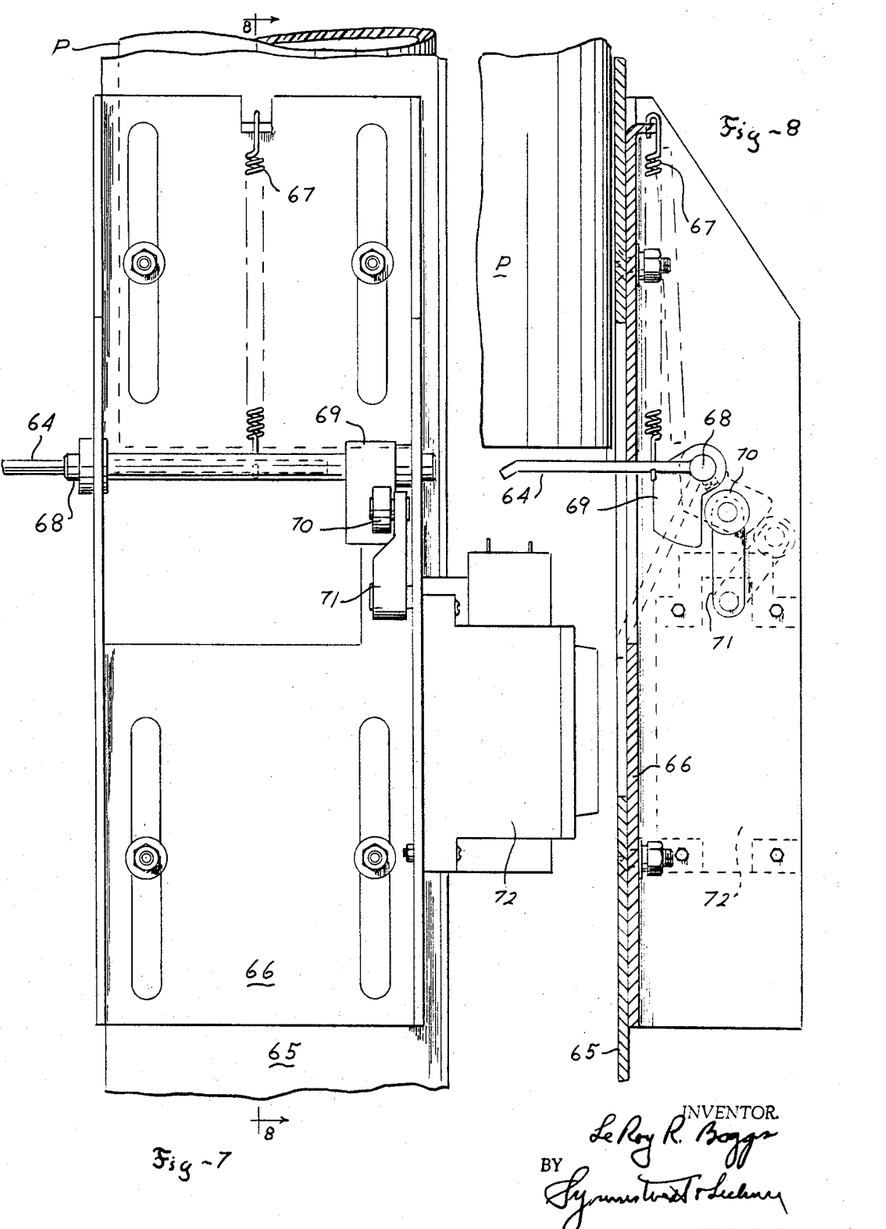
FIGURE 7 is an enlarged elevational view of the trip mechanism adapted to initiate the operation of the cut-off mechanism.
FIGURE 8 is a vertical sectional view of parts shown in FIGURE 7, this view being taken as indicated by the line 8—8 on FIGURE 7.

For the purpose of initiating the cut-off operation, a trip mechanism is provided (see FIGURES 1, 7 and 8), the trip mechanism including a pivoted plate 64, the plate being mounted on a fixed structure 65 by means of the vertically adjustable plate 66, this arrangement providing for adjustment of the length of the pipe which will be delivered before the trip mechanism is actuated. The pivoted plate 64 is urged to a position projecting into the path of the pipe P by means of a spring 67. The mounting pivot or shaft 68 for the plate 64 carries a cam 69 adapted to engage the follower 70 mounted upon an operating arm 71 of a switch device 72, the switch serving to initiate operation of the cut-off mechanism when the plate 64 has been deflected downwardly under the influence of the descending length of pipe P. The manner of operation of switch 72 is described just below with particular reference to FIGURE 10.

Figure 10:
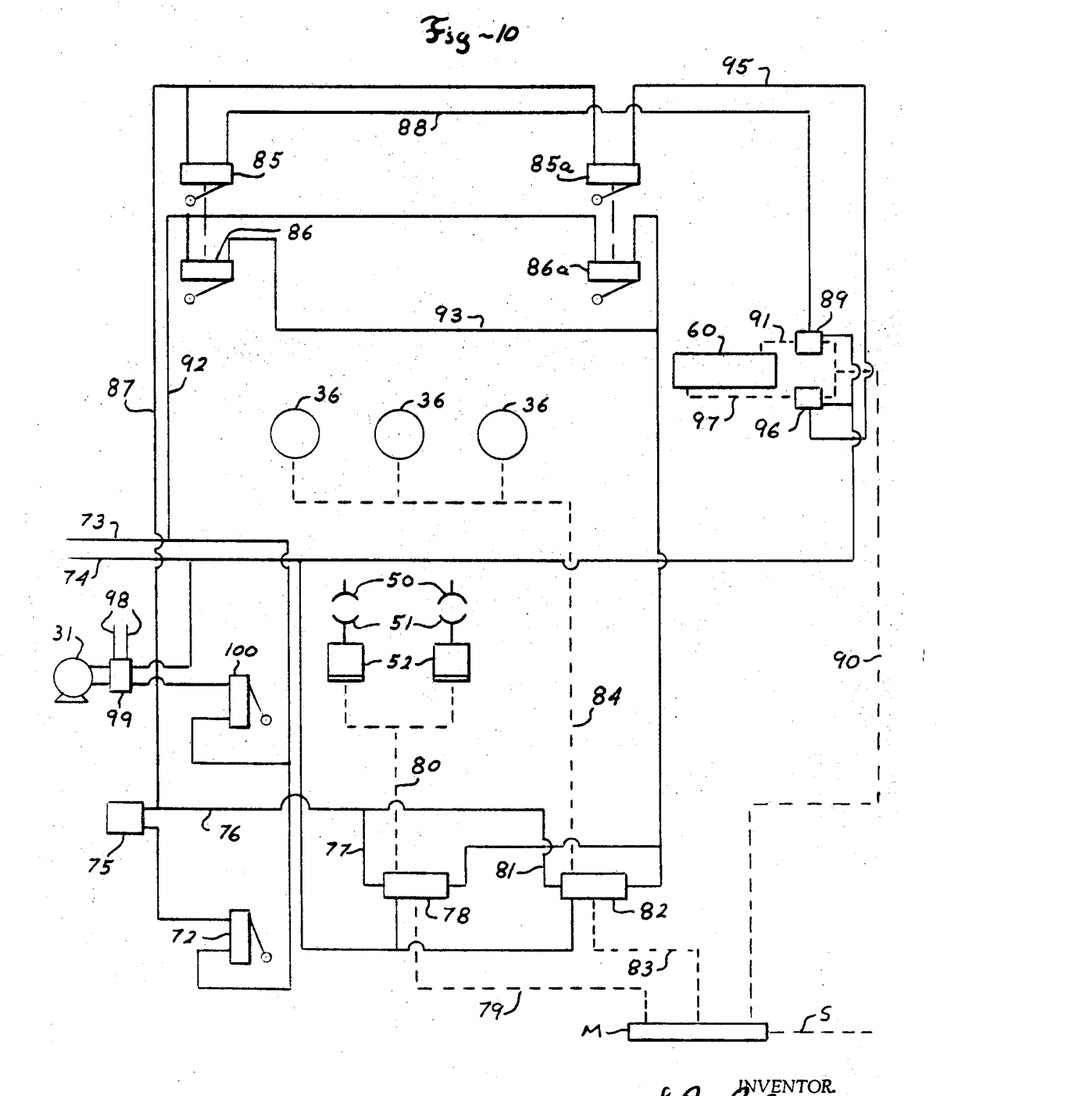
FIGURE 10 is a schematic view of a control system provided in accordance with the invention.

In FIGURE 10 electrical lines are indicated in full lines and pneumatic lines are indicated in dotted lines. The dot-dash lines indicate ganging of certain switch devices.

Power is supplied to the system through the conductors 73–74, one side of this line being connected through the switch 72 to the device indicated at 75, which comprises a well known form of pulse generating device from which a signal is delivered through lines 76 and 77 to the solenoid operated air valve 78 adapted to control the delivery of actuating air from the air supply line 79 through the air line 80 to the operating cylinders 52 for the clamp elements 51. This effects closure of the clamps and gripping of the article being made, so that the entire cut-off mechanism will follow the movement of the article. At the same time the line 76 delivers a signal through the branch line 81 to the solenoid operated valve device 82 which opens in order to supply operating fluid or air from the supply line 83 through the line 84 to the three motors 36 for driving the three cut-off discs.

Attention is now called to the fact that two pairs of ganged switches 85–86 and 85a–86a are arranged toward opposite ends of the stroke or cutting movement of one of the saw carrying plates 39 (see particularly FIGURES 2 and 5). Although switches 85 and 86 are mechanically ganged and switches 85a and 86a are mechanically ganged, the electrical functions of switches 85 and 85a are related to each other, as are the electrical functions of switches 86 and 86a.

The switches 85 and 85a control the traverse or cutting motions of the cutting discs. Thus, with the discs in the position indicated in FIGURE 2 and shown in full lines in FIGURE 9, the switch 85 is closed and a signal from the generator 75 will be delivered through the line 87 to the switch 85, through this switch and through line 88 to the solenoid operated valve 89, to open that valve and thus deliver fluid under pressure from the air supply line 90 and through the line 91 to one end of the operating cylinder 60. This effects movement of the discs from the position shown in full lines in FIGURE 9 to the position shown in dotted lines in FIGURE 9. When the dotted line position is reached, the disc carriage or mounting plate will engage the actuating element 85b, which results in opening of the switch 85, and thus closure of the valve 89 and termination of that cutting stroke.

In addition to the above, the engagement of the edge of the disc mounting plate 39 with the switch actuator 85b also operates switch 86 to close that switch. This results in supply of current through the connection 92 and through switch 86 to the connection 93 and thence through connection 94 to both of the solenoid operated valves 78 and 82, thereby closing both of said valves and thus shutting off the disc driving motors 36 and releasing the clamps 51—51 which will thus be retracted for instance under the influence of return springs (not shown).

The entire cut-off mechanism now rises under the influence of the counterweights 54 to the upper position, in preparation for making the next cut, and it will be noted that the cut-off discs remain at this time in the positions indicated in dotted lines in FIGURE 9.

The next cut is initiated when the length of tubing or pipe again is sufficient to actuate the trip switch 72, in consequence of which a pulse is again delivered from the generator 75 through the line 87. At this time, since switch 85 is now open and switch 85a closed, the pulse flows through the switch 85a and thence through line 95 to the solenoid operated valve 96, opening that valve to provide for supply of operating air from the line 90 through the line 97 to the opposite end of the cylinder 60. At the same time the pulse is delivered through line 76 to the valves 78 and 82, thereby closing the clamps and starting the disc motors. In consequence, a cutting operation now proceeds, with the cutting discs moving from the dotted positions of FIGURE 9 to the full line positions of FIGURE 9. At the end of this return stroke, the mounting plate 39 for one of the cutting discs engages the switch actuator 85c, thereby opening switch 85a and closing switch 86a. The valve 96 is thereby closed, terminating the cut-off stroke, and valves 78 and 82 are also closed, thereby resulting in shutting off of the motors and opening of the clamps. The equipment is now conditioned for a third cut-off operation, by a stroke in the direction first described above.

It will be understood that appropriate venting will be provided in connection with the operation of power cylinders, such as the cylinders 52 and the cylinders 60. In addition, as shown in FIGURE 10, the air supply lines 79, 83 and 90, may all be connected with a supply manifold indicated at M in FIGURE 10 which is supplied with air through the main air supply line S.

The manifold M and also valves 82 and 78 are advantageously mounted upon the framework of the cut-off mechanism so as to move therewith, for instance in positions as indicated at the upper right side of FIGURE 2. By mounting these devices on the vertically movable frame of the cut-off mechanism, it is only necessary to provide a flexible connection in the main supply line S.

It may also be mentioned that the offtake 48 from the dust cover 45 will be provided with a flexible connection associating the offtake with a vacuum source, in order not to interfere with the vertical motion of the cut-off mechanism.

The control system includes still another switch which is arranged to provide a safety device in the overall operation of the equipment. In explanation of this feature, it is noted that the main driving motor 31 for the machine (i.e., the motor which drives the puller mechanism 29–30 and which also effects winding of the reinforcement elements such as the rovings supplied from the spools 20) is shown not only in FIGURE 1, but also in the control system diagram of FIGURE 10. Moreover, in FIGURE 10 the power supply for the motor 31 is indicated at 98, and power is adapted to be supplied to the motor through the relay switch diagrammatically indicated at 99. This relay switch is controlled by switch 100, which is connected with the control circuitry to receive operating current from the supply line 73–74.

Relay 99 is operative to supply current from the supply line 98 to the motor 31 only when the switch 100 is closed. The location of switch 100 will be clear from examination of FIGURES 3 and 6. Here it will be seen that the switch is mounted just below the fixed plate 44, and the switch is provided with an operating element in the form of a displaceable roller 101. During normal operation of the equipment, the roller 101 is maintained in the position providing for closure of switch 100 by engagement with a vertically elongated strip or plate 102, the lower end of which is secured to one of the tracks 41 on which the cutting discs are mounted. During all normal vertical motion of the cut-off mechanism as a whole, the strip 102 maintains switch 100 closed which energizes relay switch 99 and thus continues to supply power to the motor 31 from the power supply line 98. In the event, however, that for some reason (for instance the binding or jamming of a cutting disc) a cut-off operation is not completed and the clamps 51 remained in engagement with the article, the cut-off mechanism would continue to move downwardly with the piece as it is formed and delivered, and unless this motion is arrested, this could result in serious damage to the discs or to various other parts of the equipment. To avoid this possible difficulty, the upper end of the actuator strip 102 for the switch 100 is bent away from the switch as indicated at 102a in FIGURE 6, so that upon descent of the cut-off mechanism and thus of the strip 102 to an abnormal extent, the roller 102 is released and the switch 100 opened, thereby terminating the operation of motor 31 and thus stopping the puller mechanism 29–30, as well as the reinforcement winding equipment.

From the foregoing it will be seen that the invention provides an effective cut-off mechanism, particularly adapted to use in the production of hollow articles, and having especial advantages in the production of hollow articles composed of fiber reinforced resin material, particularly where the equipment includes a puller mechanism and mechanism for effecting a winding motion of reinforcement elements.

I claim:
1. Equipment for making elongated hollow articles comprising mechanism for progressively forming and delivering continuous lengths of such an article, and mechanism for periodically cutting off finite lengths of the article during delivery thereof, the cut-off mechanism comprising three rotary cutting elements arranged in a plane transverse the direction of delivery of the hollow article, and mechanism for mounting the cutting elements including means providing for cutting movement of the elements transverse the direction of delivery of the article, the mounting means providing for cutting movement of the cutting elements respectively in paths generally representing the three sides of a triangle, with each of the cutting elements located to cut part way through the article but located so that the combined cuts completely cut off a finite length of the article.

2. Equipment according to claim 1 and further including mechanism coordinating cutting movement of the three cutting elements and providing for concurrent movement of each element along its side of the triangle and in directions so that each element follows another around the triangle.

3. Equipment according to claim 1 and further including means for effecting cutting movement of each cutting elements in each direction along its side of the triangle.

4. Equipment according to claim 1 in which the mounting mechanism for the cutting elements further includes means providing for conjoint movement of the three cutting elements in a direction paralleling the direction of delivery of the hollow article.

5. Equipment according to claim 4 and further including releasable means for connecting the mounting mechanism with the article being formed and delivered to thereby effect motion of the cutting elements with the article as it is delivered.

6. Equipment for making elongated articles, comprising mechanism for progressively forming and delivering continuous lengths of such an article, and mechanism for periodically cutting through the section of the article and thereby severing finite lengths of the article during delivery thereof, the cut-off mechanism including at least three disc type cutting elements arranged in a plane transverse the direction of delivery of the article, and mechanism for mounting each of the cutting elements including means providing for movement of each element in said plane to effect cutting of a portion only of the section of the article, the combined cut portions providing for cutting of the entire section of the article, the mounting mechanism further including means providing for movement of the cut-off mechanism with the article as it is delivered.

References Cited

UNITED STATES PATENTS 2,163,967   6/1939   Strawn et al. __________ 83—319
2,209,995   8/1940   Morris ______________ 83—319

WILLIAM J. STEPHENSON, *Primary Examiner.*